United States Patent [19]
Amberg

[11] 3,984,005
[45] Oct. 5, 1976

[54] DECORATIVE NECKBAND LABEL FOR A BOTTLE

[75] Inventor: Stephen W. Amberg, Toledo, Ohio

[73] Assignee: Owens-Illinois, Inc., Toledo, Ohio

[22] Filed: Nov. 17, 1975

[21] Appl. No.: 632,333

Related U.S. Application Data

[63] Continuation-in-part of Ser. No. 514,370, Oct. 15, 1974, Pat. No. 3,951,292.

[52] U.S. Cl. .............................. 215/230; 40/311; 138/178; 215/246
[51] Int. Cl.² ...................................... B65D 41/54
[58] Field of Search ............. 215/230, 246; 40/311, 40/310, 307, 306; 138/118, 128, 170, 171, 178

[56] References Cited
UNITED STATES PATENTS

| | | | |
|---|---|---|---|
| 2,223,017 | 11/1940 | Abrams | 215/246 |
| 2,758,735 | 8/1956 | Carter | 138/178 |
| 2,790,286 | 4/1957 | Snyder | 215/246 X |

*Primary Examiner*—Donald F. Norton
*Attorney, Agent, or Firm*—J. R. Nelson

[57] ABSTRACT

The disclosure relates to a decorative label on a closured bottle, including a pilfer-proof feature. The neck label comprises a sleeve of a shrinkable plastic material shrunken over the neck and closure skirt on a bottle. The label stock may be preprinted in a roll and is (1) scored a partial depth lengthwise along a line corresponding to a cap skirt edge position in the label, and (2) embossed by pleats angularly disposed to the direction of orientation. The pleats provide an embossed decoration which appear in each label blank cut from the roll. Label blanks are wound to a sleeve shape and the overlapped ends united at an axial seam. The sleeves with embossed decoration and pilfer-proof score therein are placed over the neck and closure skirt of a bottle such that the score line is in position adjacent the lower edge of the closure skirt. Heat is applied to shrink the label into snug surface engagement with the underlying surfaces. The pleats form an embossed pattern in the label and the pleats also avoid wrinkles in the shrunken label. Five designs of pleating pattern in the label stock are disclosed, each having the pleats biased or angularly disposed with respect to the circumferential (orientation) dimension of the label.

8 Claims, 31 Drawing Figures

U.S. Patent    Oct. 5, 1976    Sheet 1 of 8    3,984,005
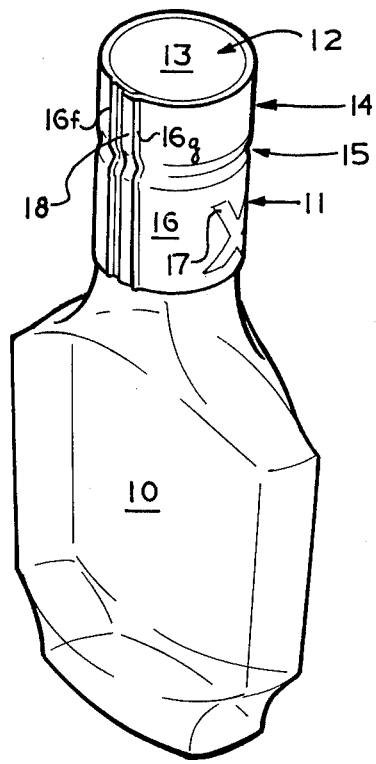
FIG. 1
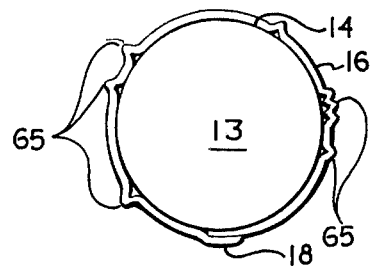
FIG. 13
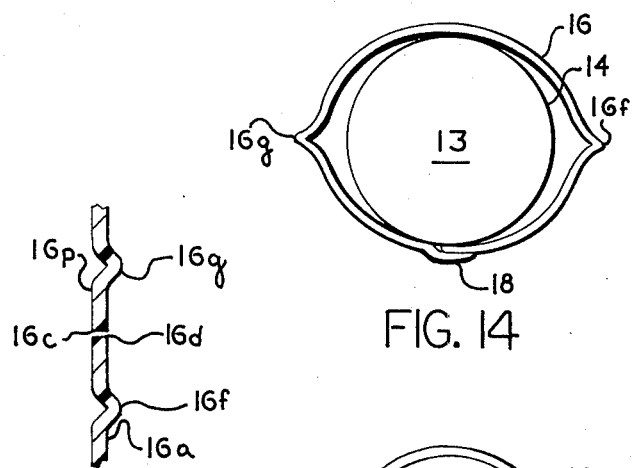
FIG. 4 / FIG. 14
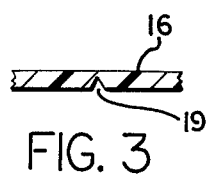
FIG. 3
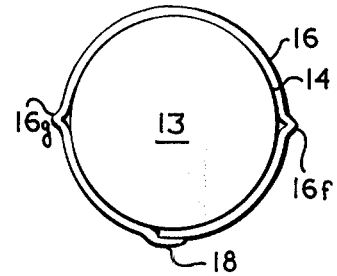
FIG. 15
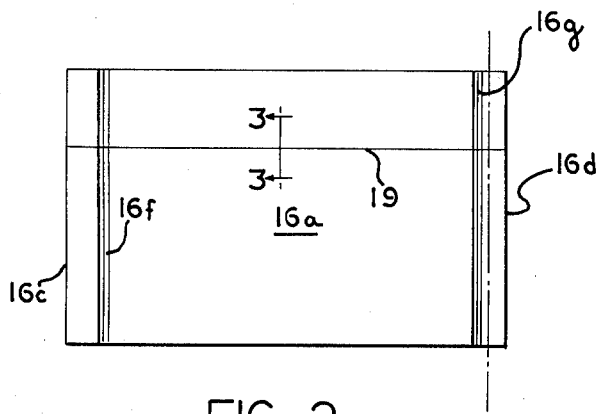
FIG. 2
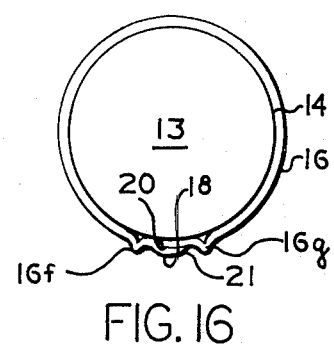
FIG. 16

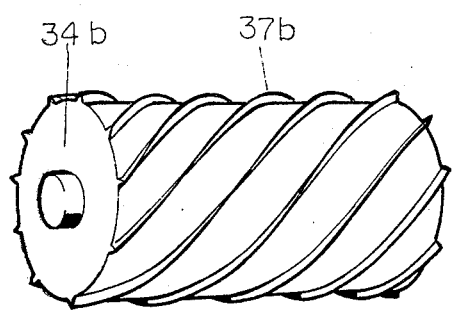
FIG. 22
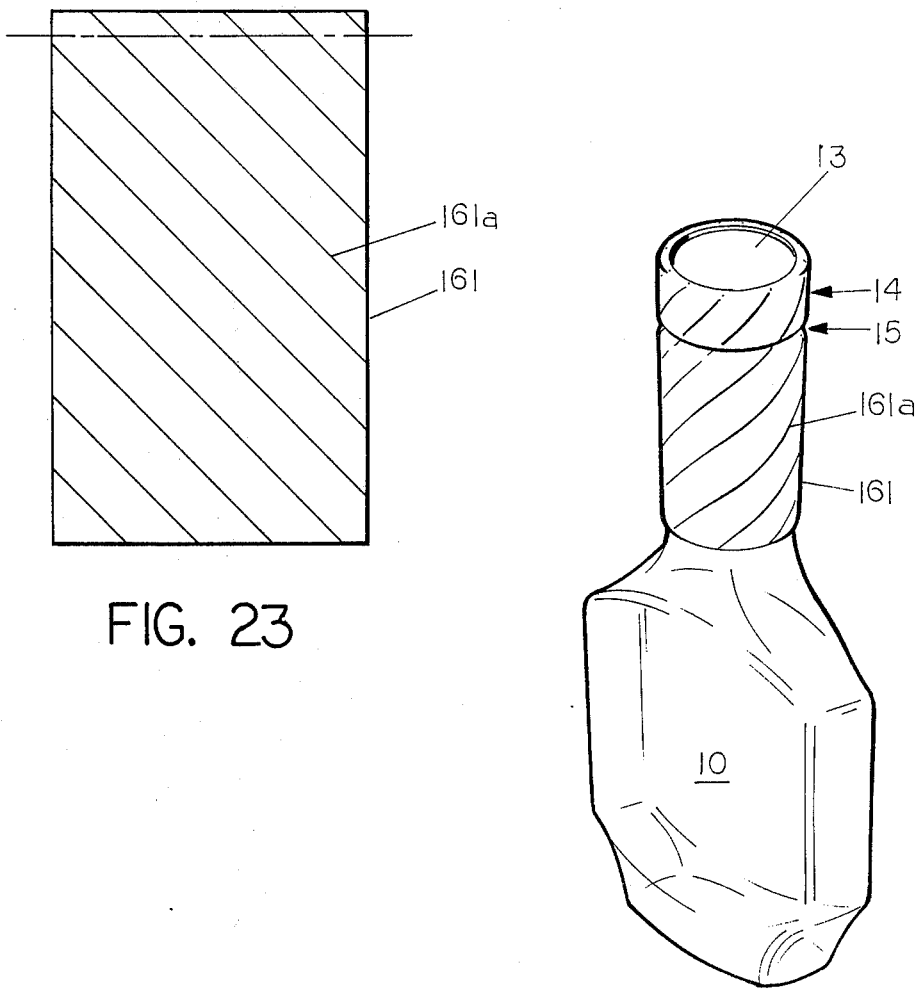
FIG. 23
FIG. 24

DECORATIVE NECKBAND LABEL FOR A BOTTLE

This application is a continuation-in-part of my earlier copending application, Ser. No. 514,370, filed Oct. 15, 1974, now U.S. Pat. No. 3,951,292, entitled "Pilfer-Proof Neckband for a Bottle."

The invention relates to a decorative neck label for a glass container comprised of an element of heat shrunken foamed plastic material and includes decorative raised, embossed patterns on the outwardly facing surface thereof.

SUMMARY OF THE INVENTION

In my earlier application, the neck label was formed of prestretched and oriented cellular, organic thermoplastic in which plural vertical pleats were provided in a sleeve label that was highly oriented circumferentially. The vertical pleats were disposed annularly in the label so as to absorb wrinkles of the material as occurs otherwise upon shrinking the sleeve about the bottle.

It has now been discovered that a pattern of these pleats may be made in the material running angularly with respect to the direction of such orientation in the material with the result that after shrinking an embossed pattern is achieved appearing on the outer surface of the label as an attractive embossed decoration. This may be combined with decorative color printing of the material while in flat or sheet form, thereby accenting or enhancing a novel decorative effect of the label on the bottle.

In the invention, the neck label is formed from a prestretched and oriented ribbon or web of the cellular, organic thermoplastic. The orientation of the plastic is a major amount along the longitudinal direction of the web. The web or ribbon is formed from a larger web of the material which may be, as desired, previously printed with a decoration of color, lettering and the like, in flat form. The printed stock is sized to a width that represents the height of the label on the bottle.

As is preferred in the present invention, the oriented ribbon of label stock is fed through a mechanism for repeatedly fluting the sheet material by compressing it along a line causing a flute or pleat to be formed (much like in a pleated fabric). In heat shrinking the encircling label on the bottle, the fluting of the label shrinks differently and concentrates air underneath the pattern of the flutes during shrinking. The result is an embossed or raised pattern on the surface of the label.

As was disclosed in my earlier invention, the label stock may also be scored in a line that will appear as an annular score in the label for determination of pilfering of the package. In this case, the label is shrunken over the closure skirt and the bottle neck surface. The pilfer-proofing or pilfer detecting feature is provided as follows.

The ribbon is partially slit lengthwise at the proper transverse location thereon. By partially slit is meant that a knife edge cuts into the plastic to weaken it at a "score line" but without severing it. One example would be to cut into the ribbon of, say 10 thousandths of an inch thickness, to a depth of 5 thousandths of an inch. This slit is made on the back side of the label stock, i.e., the side opposite the decorated surface thereof. After the label is applied and shrunken over the neck of the bottle and skirt of an applied closure cap, the encircling slit in the material will align approximately with the lower edge of the cap skirt. In opening the bottle, unscrewing the cap will annularly sever the label along the slit line into two parts, an upper part on the cap skirt and a lower part on the neck of the bottle. This severing of the material in the label provides an indication that the bottle cap has been loosened or the bottle opened. The package is thereby provided with a pilfer-proof feature; that is, an indication to the consumer or user of the bottled product when a package has been pilfered or prematurely opened.

In the method of applying the labels of the present invention, the ribbon or web of the oriented, preprinted stock having longitudinal continuous slit therein and the embossing pattern of flutes formed therein is fed onto a drum where the proper lengths of the material (blanks) are cut in succession and placed onto mandrels. The blanks are individually wound on the mandrels and seamed by overlapping the trailing marginal end of the blank over its leading marginal end and united in the overlap by fusion, adhesion or such known means as may be convenient to form a sleeve of the material comprising the annular label. The preferred seam is one formed by fusion or a so-called "heat seal" of the two overlapping layers of plastic. The sleeve label is then shifted from the mandrel over the cap and neck of the bottle, and finally located at the proper elevation position thereon. In this position the annular slit providing the pilfer-proofing feature is placed adjacent the lower annular edge of the cap skirt. Otherwise, the label is located at the desired position on the bottle for next shrinking it in place.

For shrinking the label, the bottle, closure and label sleeve are placed adjacent a heater device, such as infrared heat source, supplying sufficient heat locally to shrink the material of the sleeve into a snug fit about the bottle and cap skirt. Having formed the pleats or flutes in the plastic material, during the heat shrinkage operation these line impressions (compressions of the cellular material) react differently than the balance of the label material adjacent thereto. The line impressions form indentations in the material on the back face of the cellular plastic ribbon and the indentations provide a small channelled air space next to the bottle surface. As the main body of the label sleeve material shrinks during heat, it engages tightly onto the glass surface and seals off these embossed channel areas. At about the same time, the heat increases the pressure of the air entrapped in the little channels retaining or accentuating the embossed pattern provided by the line impressions made in the material while it was cold. The material of the embossed pattern more or less takes a set, and the decorative effect is achieved in the labelled container, which is above and beyond the decoration, if any, printed onto the sheet material before it was subjected to the pleating. Skillful design may provide a combination of the embossing of patterns in the surface of the label with pre-printing of colors or images.

It should be mentioned, that if the pilfer-proofing feature is incorporated into the label, it may be preferred to adhere the lower label section onto the neck of the bottle so that as the cap skirt is twisted to unscrew the cap, the lower section of the label is held stationary and the severing of the label into lower and upper sections on the neck and cap skirt, respectively, along the line of weakening is readily assured. This is most conveniently accomplished by pretreating the glass surface of the neck of the bottle with adhesive prior to assembly of the sleeve label thereon. After the label shrinks snugly on the neck, the adhesive will bond the lower section of the label onto the glass for the severance function to provide the package with the pilfer-proofing feature.

It is therefore an object of the present invention to provide a decorative shrink-type bottle label possessing an embossing pattern that will, upon shrinking, enhance the appearance and function of the package.

A further object of the invention is to provide such a decorative label on the neck and cap skirt of the bottle so as to include therein a pilfer-proof feature.

Another object of the invention is to provide a method of forming such an embossed and decorative label conveniently and economically and applying it onto bottles.

Other significant features, objects and advantages of the invention will occur to persons skilled in the art from the description appearing hereinafter and the related drawings.

BRIEF DESCRIPTION OF THE DRAWINGS

On the drawings appended hereto:

FIG. 1 is a perspective view of a bottle with a label applied and shrunken snugly over the skirt of the closure and the neck of the bottle.

FIG. 2 is a plan view of a label blank, before it is wrapped and seamed to a sleeve, showing the pleats and slit line thereof.

FIG. 3 is a sectional view taken along line 3—3 on FIG. 2.

FIG. 4 is a partial, sectional view of the pleated stock formed by the device of FIG. 7, after the web is severed by the device shown on FIG. 8.

FIG. 13 is a partial top plan view of a bottle with a shrink-type label applied prior to the present invention.

FIG. 14 is a partial top plan view of a bottle and shrink-type label sleeve thereon prior to shrinking, illustrating the pleats in the label sleeve in accordance with the present invention.

FIG. 15 is a partial top plan view of the bottle and label of FIG. 14 after shrinking the label onto the bottle and cap.

FIG. 16 is a partial top plan view of another embodiment of a label shrunken onto the bottle neck and cap in accordance with the present invention.

FIG. 10 is a plan view of a rectangular blank of the oriented, cellular thermoplastic processed through the apparatus of FIG. 19.

FIG. 22 is a perspective view of a different form of the embossing roll as shown on FIG. 18.

FIG. 23 is a top plan view of the rectangular blank of oriented, cellular thermoplastic after being processed through the embossing roll of FIG. 22.

FIG. 24 is a perspective view of a glass bottle having the sleeve form of embossed label made from the blank of FIG. 23 shrunken onto the neck and closure of the bottle.

DETAILED DESCRIPTION OF THE DRAWINGS

Figure 5:
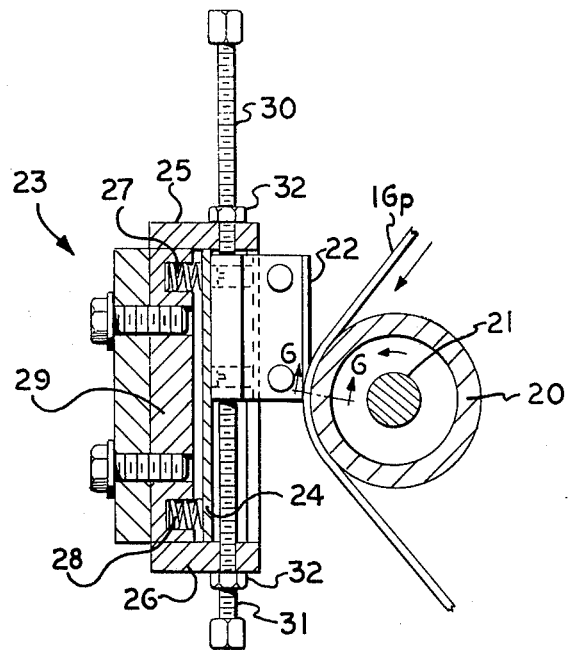
FIG. 5 is a sectional plan view of a device forming a partial depth slit in the label stock material running longitudinally of a web of the material.

Referring to the drawings, FIG. 1 shown a glass bottle 10 including a neck 11 closed by a primary closure, such as a screw cap 12. Cap 12 (FIG. 9) includes a top 13 and an integral skirt portion 14 that terminates in a lower annular edge 15 along the neck 11.

A shrunken secondary closure 16, in the form of a pilfer-proof neck and closure label, made of a shrinkable, cellular polymeric material encircles bottle neck 11 and skirt 14 of cap 12, bridging the juncture between the neck of the bottle and the skirt edge of the cap. The shrinkable polymeric material may be any of the forms of shrinkable organic foamed thermoplastics which may be highly oriented in a dimension that extends circumferentially on the bottle of FIG. 1. An example of such material is a cellular polymer material that is highly oriented in a web or sheet form and as may be preprinted in flat form with a label decoration or image illustrated at 17. Preferably, the polymer material, such as foamed sheet of polystyrene, polyethylene or polypropylene, should be on the order of 0.005 to 0.020 inches in thickness and of a bulk density of about 6–40 lb. per cubic foot.

The label 16 is formed from a rectangular blank 16a of the material illustrated on FIG. 2. The inside surface of the label is shown on FIG. 2, i.e., the surface that will be next to the neck surface of bottle 10. Label blank 16a is formed from a parent web 16p of the material that is sized in width to correspond with the desired height dimension of the label, this dimension being along the side 16c of the blank. Label blank 16a is sized in a length dimension along the longitudinal direction of the web 16p that is in excess of the circumference of the bottle neck or closure, whichever is larger, of the bottle 10, closure 12 combination.

Label blank 16a is wrapped into a sleeve form by overlapping the marginal leading and trailing ends 16c and 16d thereof, and the overlapped ends are connected together along an axially extending seam 18. The label formed in accordance with the invention may possess the decorative embossed feature of the invention either alone or in combination with the pilfer-proof feature. If the pilfer-proof feature is to be utilized, the label 16 is provided with the lengthwise partial depth slit 19 in the web 16p which appears in the label blank on FIG. 2. This slit is in the direction of the major orientation in the plastic web and should be of sufficient depth to provide a line of weakening in the material extending around the circumference of label 16 and be located adjacent the lower edge 15 of the cap skirt. Slit 19 is shown on FIG. 3 in cross-section and is in depth approximately one-half of the web 16p thickness, e.g. one-half the thickness of the label blank 16a.

Label blank 16a also contains a series of the spaced apart pleats, such as 16f and 16g, shown on FIG. 4. Pleats 16f and 16g are placed in spaced apart relationship around the circumference of the bottle neck and closure. The pleats, such as 16f and 16g, provide a vertical embossed pattern in the label and also absorb wrinkles in the label that tend to form in the shrinking of the label onto the bottle neck and closure. By localizing the wrinkles in the pleats, a better appearance is obtained in the label along with the overall decorative appearance of the package provided by the selected embossed pattern, several examples of which are given hereinafter.

One such simplified example of the invention is illustrated in FIGS. 14 and 15. The label has pleats 16f and 16g distributed in the label blank 16a so that they will be approximately diametrically opposite each other in the sleeve form of the label 16 (FIG. 14). After shrinking, the pleats remain on opposite sides of the bottle and cap (FIG. 15).

THE SLIT PRODUCING APPARATUS

Figure 6:
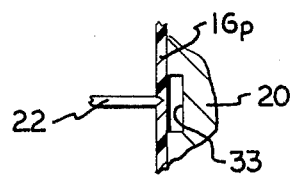
FIG. 6 is a fragmentary sectional view taken along line 6—6 on FIG. 5.
Figure 7:
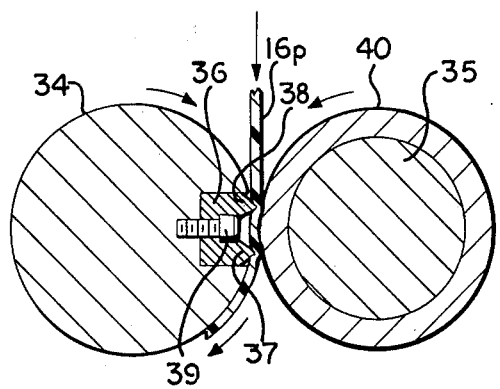
FIG. 7 is a sectional plan view of a pleating device forming spaced apart transverse pleats, in pairs, in the label stock material in web form, which is illustrative of one of the embodiments of the invention.
Figure 8:
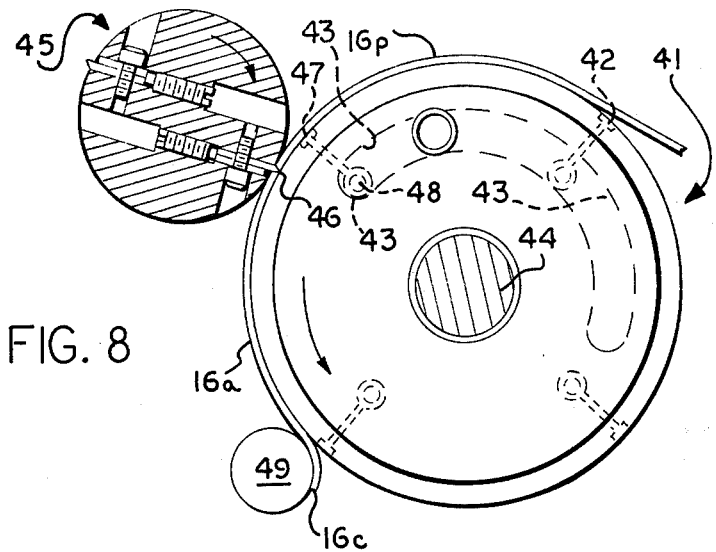
FIG. 8 is a sectional plan view of a device for cutting a label blank from the web of label stock and feeding the label blank to a mandrel.

Referring now to FIGS. 5–7, the web of the foamed thermoplastic material 16p is fed from a supply (not shown) of the predecorated label stock moving over a roll 20 which is supported on a vertical shaft 21. The partial depth slit 19 (described earlier herein) is made in the label stock on the back side surface thereof by a blade 22 carried in the stationary holder assembly 23. Blade 22 is fastened in a longitudinal groove of a guide member 24 that is retained between the sides 25 and 26 of holder 23 and normally urged outwardly by springs 27 and 28 in the back plate 29. Blade 22 is adjusted longitudinally on the guide member 24 by the opposed adjusting screws 30 and 31, respectively, threaded in the sides 25 and 26 and each held in place by a lock nut 32. This adjustment compensates for wear in blade 22.

Blade 22 is supported opposite an annular recess 33 in roll 20 (FIG. 6), and as the web 16p is driven over roll 20, the slit 19 is made continuously lengthwise of the label stock web at the proper height thereof so as to correspond to the elevation in the label, as applied, opposite or adjacent the lower edge 15 of the primary closure skirt.

THE WEB EMBOSSING APPARATUS

After processing over roll 20, the label stock web 16p passes between the rollers 34 and 35 also rotatable on vertical shafts. The embossing roller 34 is provided with the embossing tool 36 which extends axially of the roll over the width of the web. Embossing tool 36 related to the embodiment of FIGS. 2, 4 and 16 is provided with a pair of relatively closely spaced pleat forming tips 37 and 38 extending parallel to the axis of roll 34; and the tool 36 is held in roller 34's recess by screws 39. The surface portion 40 of roll 35 is of a relatively yieldable material, such as rubber or the like, preventing fracture of the more or less crushed web along the apex lines of tips 37 and 38. There is a slight deflection of the plastic along the plane of the material at the opposite surface from the contact by the tips 37, 38 when the rubber faced back up roll 35 is used. This is illustrated by FIG. 4. There is nevertheless some crushing and compressing of the cellular material.

The embossing roll 34 may take several forms, such as illustrated by FIGS. 18, 22, 25, and 28 and, as will be apparent to those skilled in the art, different combinations of embossing rolls, such as 34, 35, or 34a, 35a, etc. may be run in tandem and synchronized to form the pleats in the web 16p in succession as desired to achieve a more complex embossing effect of the decoration.

Figure 18:
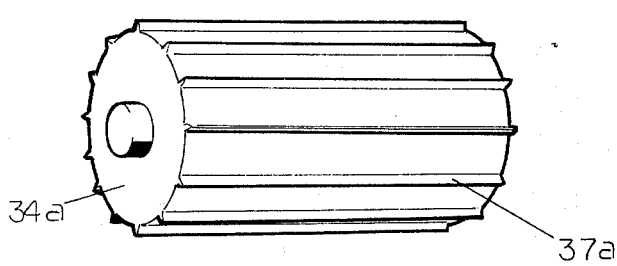
FIG. 18 is a perspective view of an embossing roll used in forming the labels of the invention.
Figure 20:
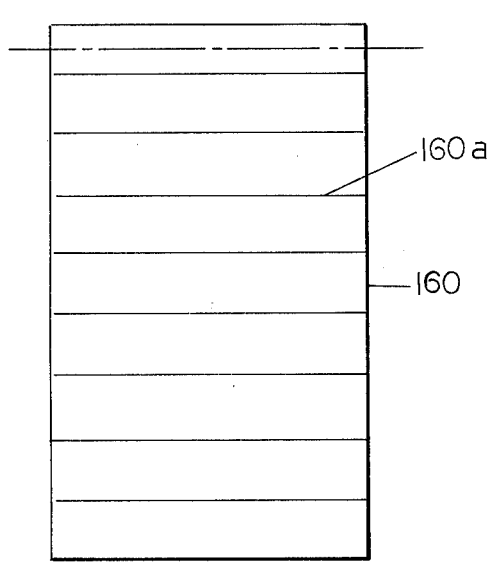

Referring to FIG. 18, embossing roll 34a represents the tool for forming a spaced apart series of pleats in the web 16p for making the sleeve blank 160 (FIG. 20). The roll 34a, as is the case with all of the forms of the embossing roll shown on FIGS. 18, 22, 25 and 28, is run in combination with a roll 35a, which is constructed of relatively hard material, such as steel or aluminum. In this form of the apparatus (cf. apparatus of FIG. 7), there is no deflection of the material at the surface of the plastic on roll 35a. The line pattern is impressed by crushing the material in the configuration provided by the roll 34a. The two rolls 34a and 35a are rotated about their shafts in the direction of movement of the web 16p. The pleat forming tips 37a, which extend along roll 34a parallel to the axis, emboss in the web 16p a spaced apart series of flutes or pleats 160a, (FIG. 20), which are normal to the running machine direction of web 16p, the highly oriented dimension of the cellular, polymeric, thermoplastic sheet material.

Figure 21:
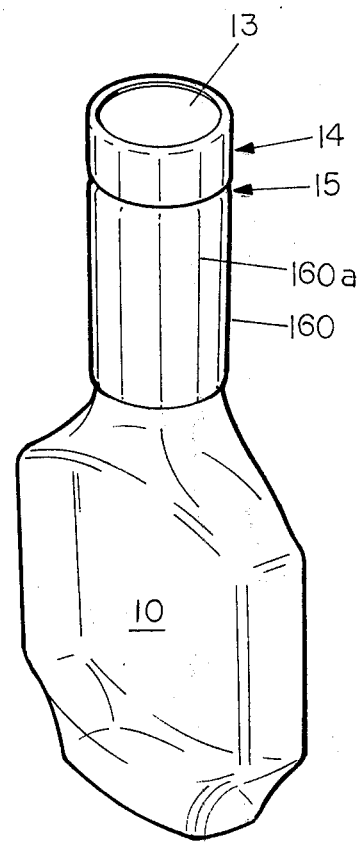
FIG. 21 is a perspective view of a glass bottle having a sleeve form of embossed label made from the blank of FIG. 20 shrunken onto the neck and closure of the bottle.

From the web of this form of the invention, the blanks 160 are cut in a manner hereinafter described and the blanks are wound on a cylindrical mandrel and the ends of blank 160 overlapped and seamed. The sleeve made from blank 160, when shrunken onto a bottle neck and closure, provides a neck label shown on FIG. 21, having annular spaced apart, vertical flutes or pleats 160a in the embossed decorative pattern.

Figure 19:
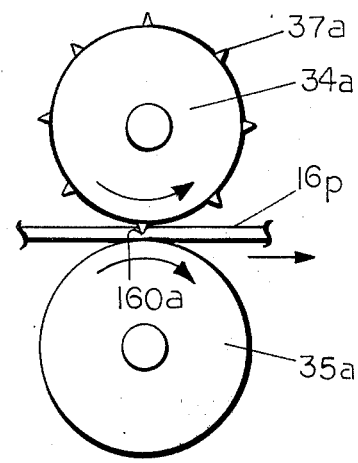
FIG. 19 is a sectional elevational view of the embossing roll of FIG. 18 and a back up roll in an operating position for embossing the web of oriented cellular thermoplastic.
Figure 19A:
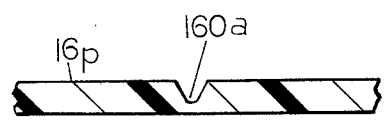
FIG. 19A is a partial, longitudinal sectional view of the thermoplastic web showing the crushed, embossed line pattern in section that is impressed by the apparatus of FIG. 19.

Similar embossing tools are shown on FIG. 22 wherein the tool 34b is provided with a series of spaced apart helical or spiral pleat forming tips 37b. This embossing tool combined with a roll 35 or 35a, similar to the illustration on FIG. 19, will provide a pattern of pleats 161a as shown on the sleeve blank 161 made from the web stock processed through roll 34b (FIG. 23). The sleeve made from blank 161, when shrunken onto the neck and closure of a container 10, provides an embossed pattern of spiral pleats 161a thereon.

Figure 25:
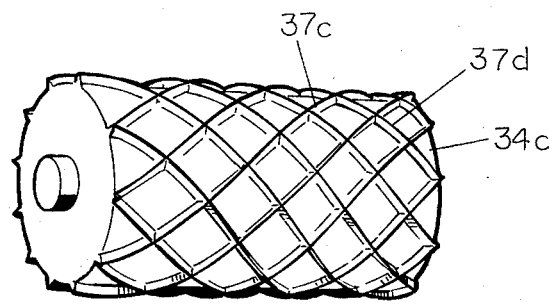
FIG. 25 is a perspective view of a still different form of the embossing roll.
Figure 26:
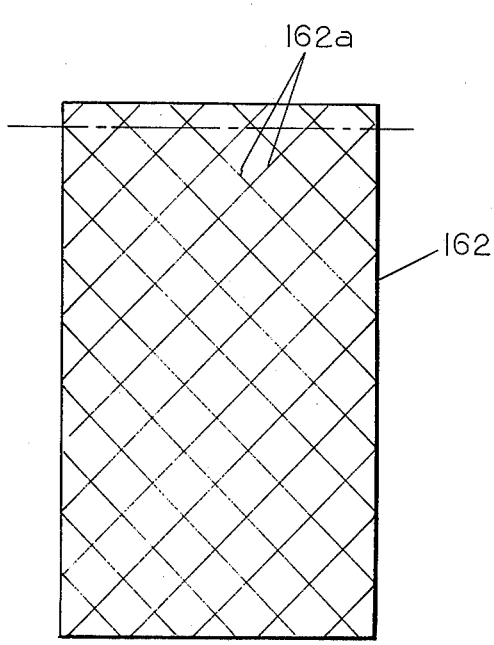
FIG. 26 is a top plan view of the rectangular blank of oriented, cellular thermoplastic after being processed through the embossing roll of FIG. 25.
Figure 27:
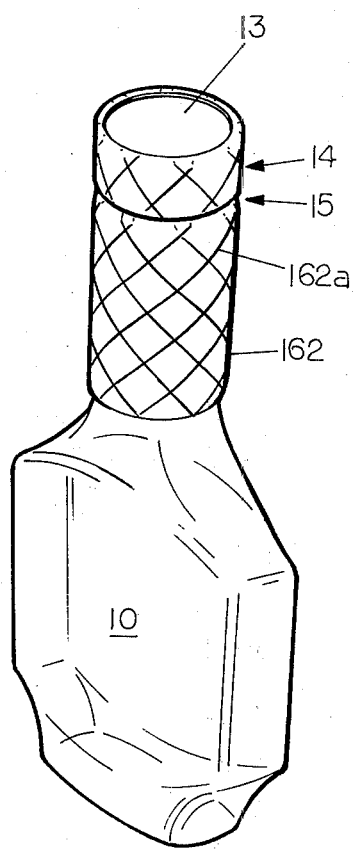
FIG. 27 is a perspective view of a glass bottle having the sleeve form of embossed label made from the blank of FIG. 26 shrunken onto the neck and closure of the bottle.

Referring to FIG. 25, yet another form of embossing tool is shown by the roll 34c having a series of spaced apart helical or spiral pleat forming tips 37c in a right hand pattern and a second series of spaced apart similar helical or spiral pleat forming tips 37d running in a left hand pattern crossing the tips 37c. This embossing roll combined with a back up roll 35 or 35a, as before, will provide a criss-cross pattern of pleats 162a in the formed plastic material, as shown on the sleeve blank 162 made therefrom (FIG. 26). The sleeve made from blank 162 is shrunken onto the neck and closure of a bottle, as shown on FIG. 27, in which the label provides an embossed decoration or design of the criss-crossed spiral-like pleats 162a raised on the label surface.

Figure 28:
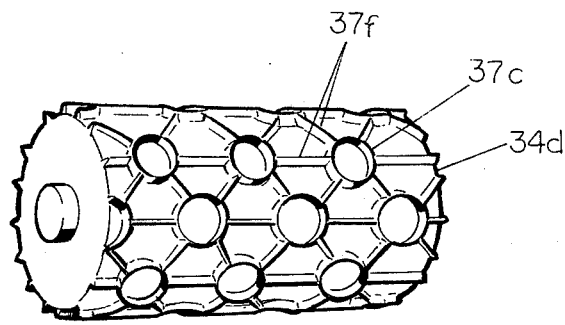
FIG. 28 is a perspective view of still another form of embossing roll.
Figure 29:
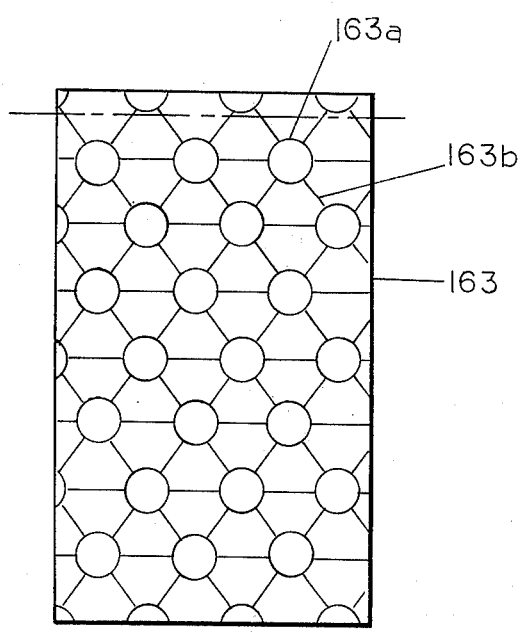
FIG. 29 is a top plan view of the rectangular blank of oriented, cellular thermoplastic after being processed through the roll of FIG. 28.
Figure 30:
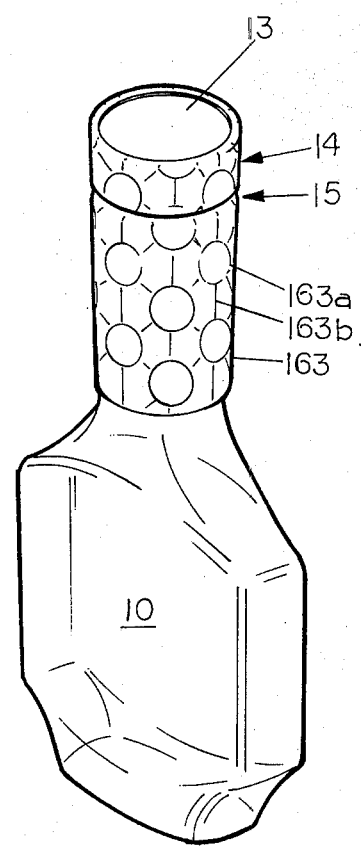
FIG. 30 is a perspective view of a glass bottle having the sleeve form of embossed label made from the blank of FIG. 29 shrunken onto the neck and closure of the bottle.

Yet another form of embossing roll 34d is shown on FIG. 28. Roll 34d includes a pattern of embossing tips comprised of an arrangement of spaced apart circle tips 37e interconnected by straight line tips 37f radiating from the centers of the circles. This embossing roll 34d, when operated with a rubber back up roll 35 or steel roll 35a, as earlier described, will impress the material of the sleeve blank 163 (FIG. 29) with the circular pleats 163a joined at their perimeters by the line pleats 163b which are angled with respect to the machine longitudinal dimension of the blank 163. The sleeve made from blank 163 is shrunken onto the neck and closure of a bottle, as shown on FIG. 30, in which the label provides an attractive embossed decoration of the circles 163a and lines 163b in a raised pattern of the pleats on the label surface.

Numerous other designs may be devised in accordance with the invention, wherein the pattern of the pleats in the embossed design run at an angle with respect to the dimension of the material corresponding to the circumference of the sleeve, i.e., the dimension of the high degree of orientation in the material, i.e., the machine direction of the web of foamed thermoplastic. The more pronounced embossing effect is attained by placing the surface at which the crushed line impressions are made next to the container's exterior surface, i.e., on the inside surface of the sleeve.

THE SLEEVE MAKING APPARATUS

After embossing the label stock web 16p with a design, the web 16p next is brought over feed drum 41 and picked up by a forward vacuum port 42 that is connected to stationary vacuum manifold 143, supported over the top side of the drum. Drum 41 is rotated on a vertical shaft 44 at a speed in excess of the moving speed of the web 16p up to this point. This creates a taut condition in web 16p on drum 41 and causes some slippage between the two. A rotary knife 45 timed to the linear speed of web 16p carries a vertical blade 46 which severs the web transversely on drum 41 and cuts from the web a label blank 16a of proper length, such as shown on FIG. 2. The web stock is fed over the feed drum 41 such that the embossed and decorated surface thereof is next to the drum peripheral surface. In other words, the cut is made from the back side of web 16p in relation to the front or decorated side. Just ahead of knife 46, a second vacuum port 47 is holding the web in place by vacuum connected through its passage 48 just about to break its connection with vacuum manifold 43.

The label blank 16a that is cut and on feed drum 41 beyond knife 46 has its leading edge 16c being wrapped on mandrel 49 on a rotary turret, which is simultaneously wrapping and pulling the label blank from the feed drum after the mandrel picks it up from the drum's surface.

Figure 11:
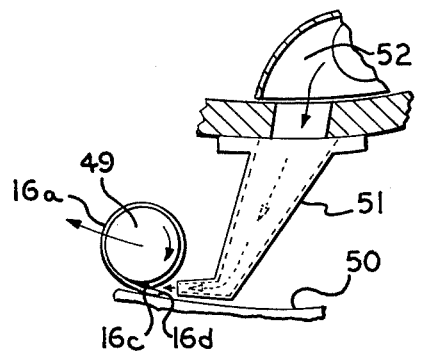
FIG. 11 is a plan view, partly broken away, of the device for making a "heat seal" seam on the overlapping ends of a label blank treated in FIG. 9 to form the label sleeve of the invention.
Figure 12:
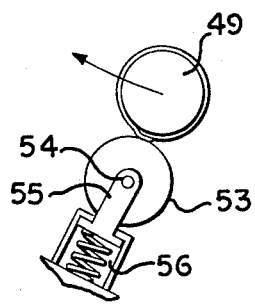
FIG. 12 is a companion view to FIG. 11, schematically illustrating a means for applying some pressure to the heated overlapped end portions of the label sleeve treated in accordance with FIG. 11.
Figure 10:
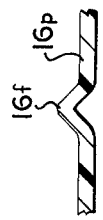
FIG. 10 is a fragmentary, sectional view, taken along line 10—10 on FIG. 9, on the label blank of one embodiment of the invention illustrating the pleat made in the predecorated label stock from which the blank was made.

The several mandrels 49 are part of a machine assembly shown schematically on FIGS. 11 and 12. Label blank 16a is held on the mandrel 49 near leading edge 16c by vacuum, and mandrel 49 is rotated clockwise (FIG. 11) while moving in an arcuate path along a guide rail 50 which controls the unwound trailing part of label 16a. The mandrel device includes an air nozzle 51 which passes over a manifold connection at 52 on the machine and receives hot air therefrom. Manifold 52 is stationary on the machine and nozzle 51 moves in an arc path past it to make this connection for supplying the hot air to the nozzle tip at the time the label is nearly wrapped on the mandrel and is an end-overlapping fashion shown in FIG. 11. The hot air is applied by the tip of nozzle 51 into the space between the overlapping ends 16c and 16d of the label blank. Therafter, as sufficient heat is applied by the nozzle, the mandrel continues to rotate and completely overlap and join the ends of the label into a sleeve. The ends are finally joined at a subsequent movement of the mandrel in its path whereat the overlapped ends of the label are compressed by engagement with the wheel 53 (FIG. 12). The wheel 53 is mounted on a vertical pivot 54 and bracket 55 which is a part of a spring mounting 56 (shown schematically). As the mandrel and label sleeve move past wheel 53, the interference of the wheel surface on the overlapped vertical seam of the label sleeve compresses the heated portions of the plastic into a firmly bonded joint or seam.

ASSEMBLY AND SHRINKING THE SLEEVE ON THE BOTTLE

Figure 9:
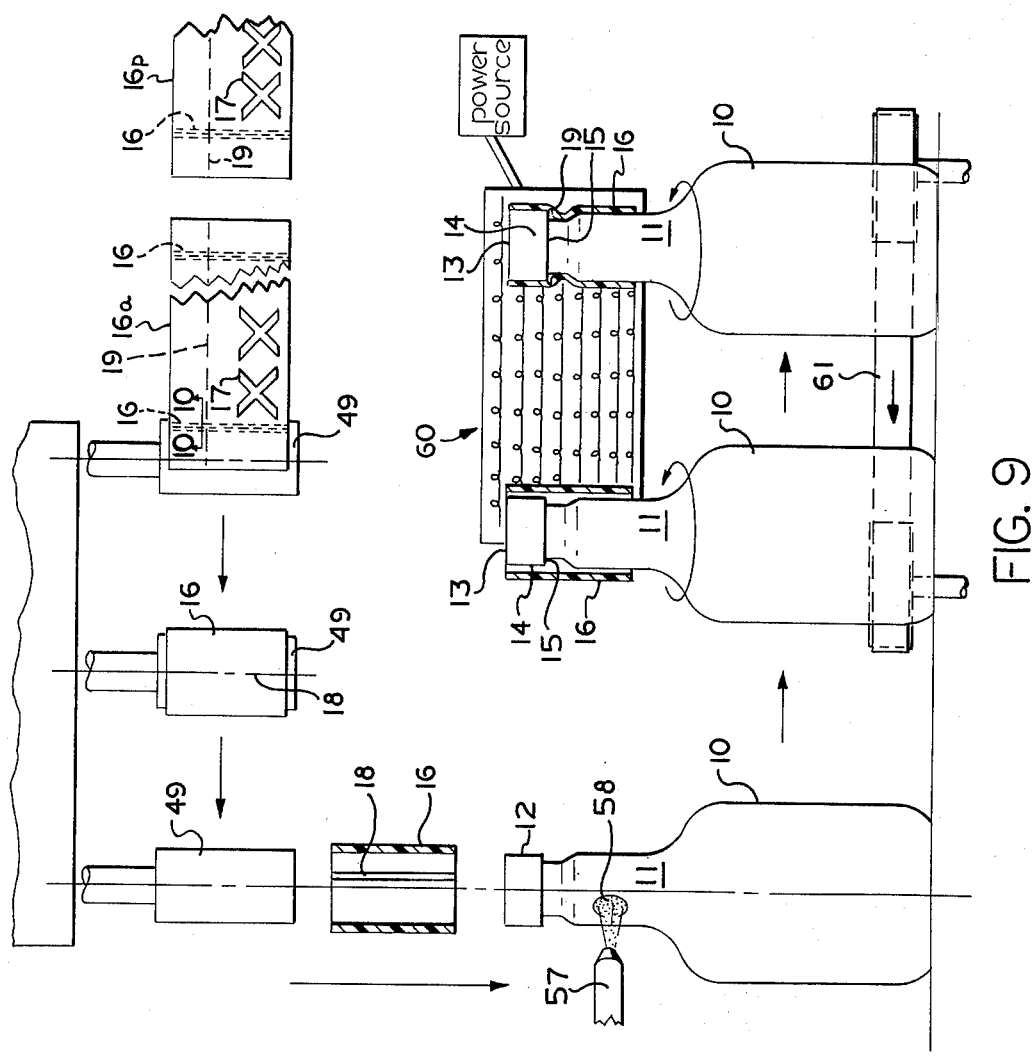
FIG. 9 is a schematic view illustrating the steps of forming the label sleeve from a label blank made from the web of label stock, transfer of the label sleeve from the mandrel telescopically locating it in place over the bottle neck and closure, and shrinking it thereon.

Referring to FIG. 9, the assembly functions of the label on the container are illustrated schematically. As shown near the top of the Figure, a cut label blank 16a is wrapped on a mandrel 49 and seamed, as previously described, and thereafter stripped from the mandrel in a vertically, downwardly direction. The bottle 10 having a primary closure 12 thereon is first transported past a glue applicator nozzle 57. A spot 58 of hot melt adhesive is sputtered or sprayed from nozzle 57 onto the surface of neck 11 of the bottle in a region over which the label (16, 160, 161, 162 or 163) will be applied.

Next, the bottle neck 11 and closure 12 receive the decorative sleeve label of the cellular, shrinkable thermoplastic material, which is lowered to a position whereat the annular slit line 19 on the inside surface of sleeve 16 is disposed at or just below the lower edge 15 of cap skirt 14. While the label is in this position on bottle neck and cap, the bottle is carried past a heating device 60, illustrated schematically, preferably in the form of an infrared electric heater. During movement past heater 60, bottles 10 may be revolved by sidewall engagement with a moving belt 61, traveling counter to the direction of travel of bottles 10. Another form of heater is the usual tunnel structure through which the bottles and sleeves are conveyed and heated by circulated hot air or the like. Regardless of the form of heater, the sleeve material is heated externally sufficiently to shrink it onto the neck and cap in a snug conforming relationship, as illustrated at the right-hand side of FIG. 9.

It is during this shrinking phase of the process that the present invention of the pre-pleated material in the label sleeve affords the means for providing a satisfactory neck and closure label on the bottle. The heat being applied externally onto the shrinkable material, i.e., heat from one side only of the material, results in a differential in the shrinking rate of the material across its thickness. Since the material is cellular, it also serves as a heat insulator and retards transmission of heat toward the inner surface. In any event, under these conditions, wrinkles tend invariably to appear in the shrunken label. The present invention provides not only a novel embossed decorative label, but also provides an economical and practical way to apply heat shrunken labels of the cellular plastic material onto a cold bottle free of wrinkles and unwanted surface deformations of this kind.

DECORATIVE PILFER-PROOF LABEL

Figure 17:
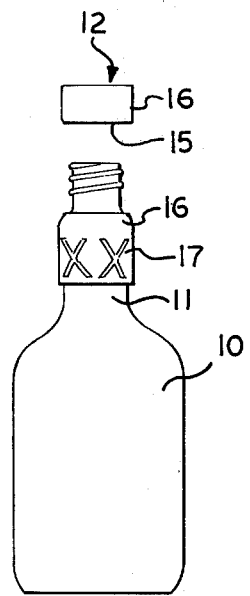
FIG. 17 is an elevational view of the labelled bottle of the invention as it is opened by unscrewing and removing the cap, the label being severed into upper and lower portions.

The decorative aspects of the label may be combined with the pilfer-proof or pilfer detection feature of the invention. Referring to FIG. 17, the pilfer-proof feature of the label is illustrated. Upon turning the closure 12, label 16 will sever annularly along slit line 19 and separate the label into two parts, i.e., an upper part on the skirt of closure 12 and a lower part adhesively secured to the bottle neck region. The closure may be reapplied and the overall label decoration, etc. is maintained; however, the line of severance will indicate premature opening or pilfering. If the product is free of pilfering at the retailer's shelf, the label 16 will be continuous and unbroken (not severed).

In connection with the present invention, the terms "pleats" or "flutes" are intended to encompass tool impressed lines in the material wherein the back up surface of the sheet may or may not be deflected from the plane of that surface in the sheet. In either case, however, the embossing tool will crush the cells of the cellular material changing its thickness and density in this region.

The weakest structure in the cellular material is along the crushed regions where embossed. Accordingly, when the sheet material is confined at its ends, such as in an endless band, sleeve or cylinder herein illustrated, the weak lines are accented during the heat shrinking treatment of the material, and the crush lines raise outwardly on the surface as the embossed pattern. The unequal cell size and density of the material along the crushed pleat or flute pattern produces the embossing effect in the shrunken label.

Having shown and described preferred embodiments of the invention, further changes, modifications and substitutions may be made by those ordinarily skilled in the art without departing from the spirit and scope of the invention as defined in the appended claims, wherein I claim:

1. A label device for application to a bottle, comprising an embossed plastic annular endless label for encircling a portion of a bottle comprised of a heat shrinkable, cellular, polymeric material that is highly oriented in the circumferential dimension of said annular endless label, said material having a bulk density in the range of 6–40 lb. per cu. ft. and a thickness of at least 0.005 inches, said label having a decorative pattern of embossed flutes therein, said pattern being comprised of at least three of said flutes said flutes being of substantially angular disposition in relation to the highly oriented dimension of the label material, and upon heat shrinking application of the label on the neck of the bottle, the decorative pattern of said flutes appears as an embossed decorative pattern on the outer surface of the label on the bottle.

2. The label device of claim 1, wherein the pattern of the embossed decoration is a series of vertically disposed, annularly spaced flutes arranged annularly around the label.

3. The label device of claim 1, wherein the pattern of the embossed decoration is a series of spiral flutes spaced apart in the label and extending annularly of the label.

4. The label device of claim 1, wherein the pattern of the embossed decoration is a series of intersecting spiral flutes spaced apart in the label and extending annularly in opposite directions on the label to provide a crossed pattern of said embossed flutes.

5. The label device of claim 1, wherein the pattern of the embossed decoration comprises a circular flute in the label.

6. The label device of claim 5, wherein the pattern of the embossed decoration comprises a series of circular flutes dispersed annularly in the label.

7. The label device of claim 6, wherein the pattern of the embossed decoration comprises the circular flutes combined in a pattern with substantially straight line flutes disposed at an angle to the highly oriented dimension of the material in the label.

8. A labelled container comprising a bottle having a neck portion and a mouth opening at the outer axial end of the neck, a closure applied over the mouth opening for closing the container, said closure having an annular skirt portion, a seamed sleeve-type label comprised of a sheet of a heat shrinkable, organic foamed thermoplastic material of at least 0.005 inch thickness that is highly oriented in its circumferential dimension of the sleeve label, the latter encircling said neck portion and the skirt of said closure, said foamed material having a bulk density of from 6–40 lbs. per cubic foot, and having a pattern of embossed flutes therein comprising at least three flutes which extend substantially at an angle with relation to the dimension of said high orientation in the foamed material, the label having an axially extending seam formed by the overlapping ends of the sheet united together, said label being shrunken into snug fitting engagement with said neck and skirt, respectively, the flutes being disposed as an embossed outstanding pattern of ridges on the labelled bottle in annularly arranged array about the exterior surface of said label.

* * * * *